June 12, 1951   J. H. HICKEY   2,556,496
PURIFICATION OF COAL
Filed Dec. 9, 1947
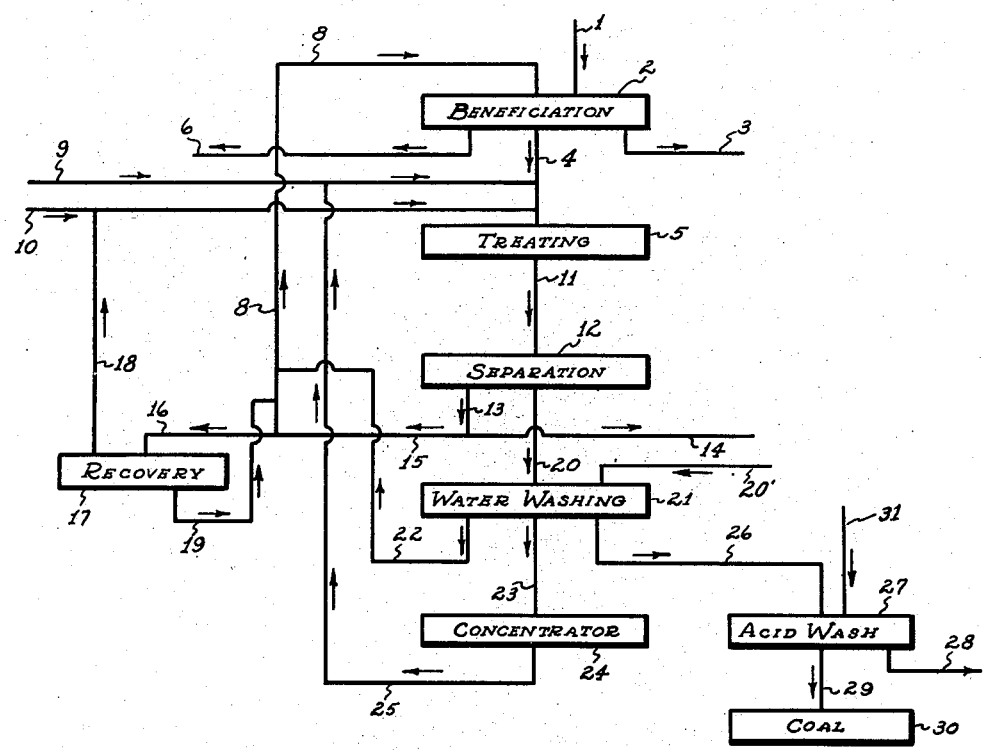
INVENTOR.
JOHN H. HICKEY
BY Lee J. Gary
ATTORNEY Patented June 12, 1951

2,556,496

UNITED STATES PATENT OFFICE 2,556,496

PURIFICATION OF COAL

John H. Hickey, Morton Grove, Ill., assignor to Great Lakes Carbon Corporation, Morton Grove, Ill., a corporation of Delaware Application December 9, 1947, Serial No. 790,528

13 Claims. (Cl. 202—25)

This invention relates to a process for purifying coal so that it may be used in connection with manufacture of electrodes, metallurgical coke, and the like.

The use of coal as a raw material for the manufacture of carbon electrodes and metallurgical coke as well as for certain other purposes has not been extensive, particularly in recent years because the coal contains excessive amounts of ash which is somewhat detrimental to the product, e. g., the presence of silica in electrodes used in the aluminum industry is objectionable because the silica appears in the finished aluminum. Iron is objectionable for the same reason. The presence of aluminum is objectionable in cokes used in the production of iron and steel for similar reasons. The presence of silica in metallurgical or blast furnace coke tends to increase the amount of coke that must be used in the production of iron or steel.

The present invention relates to a method for removing various impurities and provides an improved process for coal purification to remove such materials as silica, aluminum, iron and the like.

In a broad embodiment the invention comprises heating particles of coal in the presence of a solution of an alkali-metal hydroxide.

A specific embodiment of the invention comprises heating coal particles in the presence of an aqueous solution of an alkali-metal hydroxide, such as sodium hydroxide at a temperature above 100° C. but below about 200° C., separating the aqueous caustic solution, washing the coal first with water and then with a dilute mineral acid, and finally recovering the purified coal.

Another specific embodiment of the invention comprises reacting comminuted coal at a temperature not exceeding about 200° C. with a caustic solution of an alkali-metal hydroxide containing a hydroxy-substituted organic compound, e. g., an alcohol, or a substance which may produce the same in situ as from an ester by hydrolysis; separating the spent caustic solution from the coal, washing the coal product with water and a dilute mineral acid and recovering the coal which has thus been purified.

These and other embodiments of the invention will become apparent from the description to follow particularly as regards an additional step of mechanical beneficiation of the coal preferably under atmospheric conditions preliminary to its caustic treatment at elevated temperature.

The accompanying drawing illustrates a preferred embodiment of the process. Referring to the drawing, crushed coal of a suitable particle size, e. g., minus 4 mesh and preferably minus 60 mesh, enters through line 1 into beneficiation zone 2 where it may be subjected to mechanical beneficiation. This treatment may comprise a sink-float separation in liquid media of suitable density introduced through line 18 whereby a major portion of the particles containing excessive amounts of ash are separated by settling to form a refuse sink fraction to be withdrawn through line 3. A particularly effective and process-cooperative liquid media for this beneficiation step may comprise a solution of the alkali-metal hydroxide with which the floated coal fraction is to be subequently treated at elevated temperatures. For example, the float media may consist of an aqueous solution containing 26% by weight of sodium hydroxide and having a specific gravity of 1.28 which is adequate for many coals for sinking high ash particles and floating the relatively lower ash coal substance. However, depending on the coal treated and extent and economy of mechanical ash separation, the gravity of the media may be altered by varying the concentration of the caustic therein to the desired value.

Alternatively, where a sink-float beneficiation is not desired for a particular coal, zone 2 with lines 3 and 6 inoperative may serve as a mixing chamber in which thorough wetting and soaking of the coal particles may be insured. In this case the concentration of the casutic solution entering through line 8 may be at a higher level by suitable control elsewhere in the process, e. g., in concentrator 24 which is described more fully later.

The float fraction of the coal together with a desired proportion of the caustic media passes from beneficiation zone 2 through line 4 into treating zone 5. A portion of the beneficiation media may be removed through line 6 and purified for re-use (not shown) or discarded. The concentration of the sodium hydroxide solution used in treating step 5 is preferably greater than the concentration employed in beneficiation step 2. Sodium hydroxide may be introduced through line 9 joining with line 4 to the treating step in order to increase the concentration to the desired value. In the treating step 5, solution concentrations of about 20–60% sodium hydroxide are used but are preferably about 30–50%. The alkali-metal hydroxide may be sodium hydroxide, potassium hydroxide, or lithium hydroxide.

In a preferred embodiment of the invention, an organic substance, such as an aliphatic alcohol or a hydrolyzable ester may be introduced through line 10 to mix with the coal. It is possible to use aqueous sodium hydroxide which contains this organic material in the mechanical beneficiation step although this embodiment is not illustrated. The organic substance may comprise an aliphatic alcohol such as ethyl alcohol, propyl alcohol, butyl alcohol or other alcohol having from two to eight carbon atoms per molecule. Or, it may be an ester of an alcohol such as the foregoing with organic or inorganic acids and which may be acted upon by the coal treating solution in the process to produce an alcohol in situ. Examples of esters which may be employed are ethyl acetate, dioctylmellitic sulfonate and the like. The lower molecular weight ketones, such as acetone, may also be used although these are not fully equivalent to the hydroxy organic compounds. Other substances that are useful may include polyhydroxy alcohols such as glycols or glycerol and their saponifiable esters; phenolic compounds, such as phenol, cresol, and higher boiling polyhydroxyphenols or mixtures thereof; derivatives of these such as phenyl acetate; and also the nuclear sulfonated hydroxy aromatics and ester derivatives. These compounds should be soluble in water, particularly in aqueous sodium hydroxide, etc., and should not decompose, except as to hydrolysis or saponification as noted, at the temperature of the operation. The preferred materials are such as may undergo reaction with the alkali-metal hydroxide to form alcoholates, phenolates and related compounds. Preferably the hydroxy compounds, esters or the hydroxy compounds resulting from hydrolysis thereof should be relatively low boiling in order that they may be recovered by distillation and reused. The percentage of organic substance in the treating solution may vary between about 0.1% to about 10%, preferably being of the order of 5%.

The presence of the organic compound referred to tends to prevent foaming, therefore making the operation go more smoothly than when this material is omitted. The organic compound apparently has a more important chemical or synergistic effect as well whereby the contact and reaction of the caustic solution with the coal is improved, an effect to "open-up" the coal, so to speak, thereby improving the overall results that are obtained. In any event, I have found that the purification of the coal is substantially improved by the use of the organic compound along with the sodium hydroxide. While the addition of an alcohol may lower the boiling point of the solution, particularly when ethyl alcohol is used, the results are not impaired as is the case when the boiling point is lowered by dilution with water.

In the treating step 5 the coal is heated at atmospheric or relatively low superatmospheric pressures up to about 400 lb./in.$^2$. The temperature is in the range of about 90–200° C. and is preferably about 120–150° C. When concentrations of caustic boiling at about 120–150° C. are used, atmospheric pressure can be employed. However, the results are improved by increasing the pressure slightly when using the lower concentrations in order to raise the temperature up to about 130 to 140° C. This apparently is a principal reason for using pressure although pressure appears to have some beneficial effect for other reasons. The time of treatment may be from about 0.5–10 hours and is preferably about 1–5 hours duration.

After the treating step is completed the coal may pass to a separation step 12 through line 11. When batch operations are used it is possible to carry out the separating and washing steps, subsequently referred to, in a single vessel. However, they are illustrated as a series of steps and may actually be carried out in separate and appropriate pieces of apparatus. In the separation step, the sodium hydroxide solution is removed through line 13. Separation may be by centrifuging, filtering, decanting, or other known method. A portion of this solution may be discarded if desired through line 14. A second portion may be passed through line 15 joining with line 8 and returned to beneficiation step 2. Part or all of the used caustic may be passed through line 16 to a recovery step 17. The organic material may be distilled out or otherwise recovered, and passed through line 18, joining with line 10 and thus return to the treating step. As a part of recovery operations in zone 17, the caustic solution may also be subjected to a step for removing silica and alumina that is dissolved therein and then pass through line 19 joining with line 8 for return to the beneficiation step. The coal from which the caustic solution has been removed may be passed through line 20 to a water washing step 21 in which the remaining sodium hydroxide solution may be removed by stepwise batch or countercurrent washing with water entering through line 20. The first and most concentrated part of the washings, particularly when using batch operation in a series of washing steps, may be passed through line 22 joining with line 8 and returned to the beneficiation step. A more dilute solution may be passed through line 23 to concentrator 24 to bring the caustic solution to the desired concentration. This solution may be passed through line 25 joining with line 9 where it may be fortified by addition of sodium hydroxide and be recycled to the treating step. An appropriate step for removing part or all of the silica and alumina from the washings may be employed as a part of the concentration step 24.

The coal which has been water washed may be passed through line 26 to acid washing step 27 to be washed with a dilute mineral acid entering from line 31 so as to remove iron and other metallic components of the ash which are soluble in dilute acid. These include calcium and the remaining traces of caustic alkali left after the water washing step. The washings are discarded through line 28 and the treated coal is passed through line 29 to purified coal storage 30. The acid washed coal may be water washed to remove residual acid although this may not always be necessary.

Among the mineral acids which may be used are hydrochloric, sulfuric and hydrofluoric acids, either alone or in admixture. Dilute solutions of mixed hydrochloric and hydrofluoric acids are particularly advantageous in that such a mixture removes the last remaining traces of silica from the treated coal. The concentration of the acids is of the order of 0.5 to 10%. Washing temperatures are usually atmospheric, e. g., within the range of about 60 to about 100° F. It is advantageous when using a continuous system to carry out the acid washing by countercurrent flow since this not only improves the washing but also results in economies due to more complete utilization of the acid.

As an alternative, solutions of salts such as ammonium chloride may be used to supplement this treatment, especially when employed immediately after the water washing step 21. A preliminary wash with dilute aqueous solution of ammonium hydroxide or ammonium chloride prior to the acid wash assists in the removal of residual sodium from the coal. Concentration of the wash solution could be about 1 to 10%. As a further alternative, the wash with ammonium hydroxide or ammonium chloride can be carried out after the acid wash to remove the last remaining portions of alkali metal ions.

The following examples are given to illustrate the process but should not be interpreted as limiting it to the exact conditions described therein.

*Example I*

Twenty grams of a minus 200 mesh gravity floated Kentucky bituminous coal having an ash content of 0.57% was introduced into a reaction vessel and stirred to a paste with 20 ml. of n-butyl alcohol. 200 ml. of a 50% (by weight) aqueous solution of sodium hydroxide was mixed with this paste. This mixture was held at its boiling point under reflux for three hours. The reaction mixture was measured twice hourly, and varied between 121° and 125° C. After cooling the reaction mixture somewhat, it was diluted with water, and filtered. The alkaline filtrate was brown in color.

The treated coal was washed extensively with water. It was then stirred up with cold 1N hydrochloric acid. The acid solution was filtered off from the coal which was then washed with water until nearly free from chlorides, and was then dried.

The analysis of the product showed the following ash content and ash constituents expressed as percent of the purified coal product.

|  | Percent |
|---|---|
| Ash total | 0.20 |
| $SiO_2$ | 0.02 |
| $Fe_2O_3$ | 0.03 |
| CaO | 0.01 |
| $Na_2O$ | 0.05 |
| $SO_3$ | 0.08 |
| Balance | 0.01 |

*Example II*

A 10/50 mesh Tennessee bituminous coal after gravity flotation yielded a float fraction containing 0.67% total ash of which 0.08% silicon and 0.12% iron formed a part. Thirty weight parts of the float fraction was mixed with 23.6 weight parts of ethyl alcohol. To this mixture was added 200 weight parts of water. Then 200 weight parts of solid sodium hydroxide was added and after its solution, the final mixture was boiled under refluxing for about three hours. The reaction mixture was diluted with water, filtered and the coal product thoroughly washed with water. The washed coal product was then leached with a 25% aqueous solution of sulfuric acid, again thoroughly water washed and dried at 40° C. The purified coal product contained 0.26% total ash of which 0.026% silicon and 0.043% iron formed a part. When the coal was subjected to the above treatment in the absence of the alcohol, the resulting coal product, although satisfactory, was not as well purified since it contained 0.51% total ash, 0.033% silicon and 0.079% iron.

I claim as my invention:

1. A process for purifying bituminous coal which comprises heating said coal in particulate form with an aqueous solution of an alkali metal hydroxide and an added volatilizable alkali soluble organic compound selected from the group consisting of an aliphatic alcohol, a mono-hydroxy phenol, a polyhydroxy phenol and a saponifiable ester of said compounds, said compound being present in an amount of about 0.1 to about 10% by weight of the treating solution, the temperature of treatment being about 90 to about 200° C., for a time sufficient to dissolve the ash and insufficient to effect substantial hydrolysis of the coal, and thereafter separating the purified coal particles from the treating solution.

2. The process of claim 1 wherein the added compound is butyl alcohol.

3. The process of claim 1 wherein the added compound is ethyl alcohol.

4. The process of claim 1 wherein the added compound is propyl alcohol.

5. The process of claim 1 wherein the added compound is phenol.

6. The process of claim 1 wherein the added compound is cresol.

7. The process of claim 1 in which the organic compound is an aliphatic alcohol having 2 to 8 carbon atoms per molecule.

8. The process of claim 1 wherein the organic compound is a phenol.

9. A process for purifying coal which comprises the steps of grinding coal to a granular powder, mixing the coal with an aqueous solution of an alkali-metal hydroxide, the concentration of which is adjusted to float the major portion of coal substances but such that the major portion of ash materials sink, separating the sink material away from the float material and the solution of alkali-metal hydroxide, adjusting the concentration of said alkali-metal hydroxide in the range of about 20–60% concentration, heating the mixture of alkali-metal hydroxide solution and floated coal at a temperature of about 100–200° C., separating the treating solution, adjusting the concentration of at least a part of said treating solution for use in said mechanical beneficiation step, and returning it to said beneficiation step.

10. In a process for purifying coal, the steps which comprise mixing a granular coal with a sink-float medium comprising an aqueous solution of an alkali-metal hydroxide of concentration to float a major portion of the coal substance but not to float a major portion of the ash substances, separating the sink material away from the floated coal and the flotation medium, adjusting the concentration of said medium to a percentage of alkali-metal hydroxide in the range of about 20–60%, heating the mixture to about 100–200° C. for a period of about 0.5–10 hours while maintaining a sufficient pressure on the mixture to prevent the water contained therein from distilling off, separating the solution of alkali-metal hydroxide, adjusting the concentration of the alkali-metal hydroxide solution to the specific gravity of the flotation medium employed in the flotation step and recycling the recovered metal hydroxide to said flotation step, washing the coal with water, separating the washings, and adjusting the concentration of the washings to a point wherein they can be recycled to a prior step in the process.

11. A process for purifying coal which comprises the steps subjecting said coal in granular form to mechanical benefication in the form of a sink-float operation, the sink-float medium comprising an alkali-metal hydroxide of concentration adjusted to give a specific gravity sufficient to permit the major portion of the coal substance to float but to permit the major portion of ash substances to sink, separating the sink material away from the floated coal and the alkaline solution, adding a water soluble volatile organic substance selected from the group consisting of an alcohol, a mono-hydroxy phenol, a poly-hydroxy phenol and a saponifiable ester of said substances, treating the coal at a temperature of about 90 to 200° C., separating the solution of alkali-metal hydroxide containing said organic compound, recovering the organic compound, adjusting the concentration of the alkali-metal hydroxide to the gravity adequate for recycling to said beneficiation step by means hereinafter described, washing the coal with water, using a portion of said wash water to adjust the concentration of the alkali-metal hydroxide as aforesaid for recycling, concentrating another portion of said washings and returning the concentrate to the treating step.

12. A process of claim 11 wherein at least a portion of the alkali-metal hydroxide solution recovered from the treating step is treated to remove compounds of silica and aluminum dissolved therein.

13. The process of claim 11 wherein the organic substance is an aliphatic alcohol having 2 to 8 carbon atoms per molecule.

JOHN H. HICKEY.

REFERENCES CITED

The following references are of record in the file of this patent:

UNITED STATES PATENTS

| Number | Name | Date |
| --- | --- | --- |
| 831,805 | Siebel | Sept. 25, 1906 |
| 1,188,936 | Hershman | June 27, 1916 |
| 1,416,955 | Herting | May 23, 1922 |
| 1,420,754 | Rodman | June 27, 1922 |
| 1,538,626 | Delamater | May 19, 1925 |
| 1,614,352 | Sumond | Jan. 11, 1927 |
| 1,780,154 | Gardner | Nov. 4, 1930 |
| 1,820,917 | Langford et al. | Sept. 1, 1931 |
| 1,824,326 | Broadbridge et al. | Sept. 22, 1931 |
| 1,871,121 | Holmes | Aug. 9, 1932 |
| 2,342,585 | Johnson et al. | Feb. 22, 1944 |

FOREIGN PATENTS

| Number | Country | Date |
| --- | --- | --- |
| 875,633 | France | Sept. 27, 1941 |

OTHER REFERENCES

Lowry: "Chemistry of Coal Utilization," vol. I, Wiley, 1945, pp. 418 to 424, 481.

U. S. Bureau of Mines Information Circular 7481, Oct. 1948.